No. 623,173. Patented Apr. 18, 1899.
E. C. NOE.
BICYCLE.
(Application filed Aug. 29, 1898.)
(No Model.)
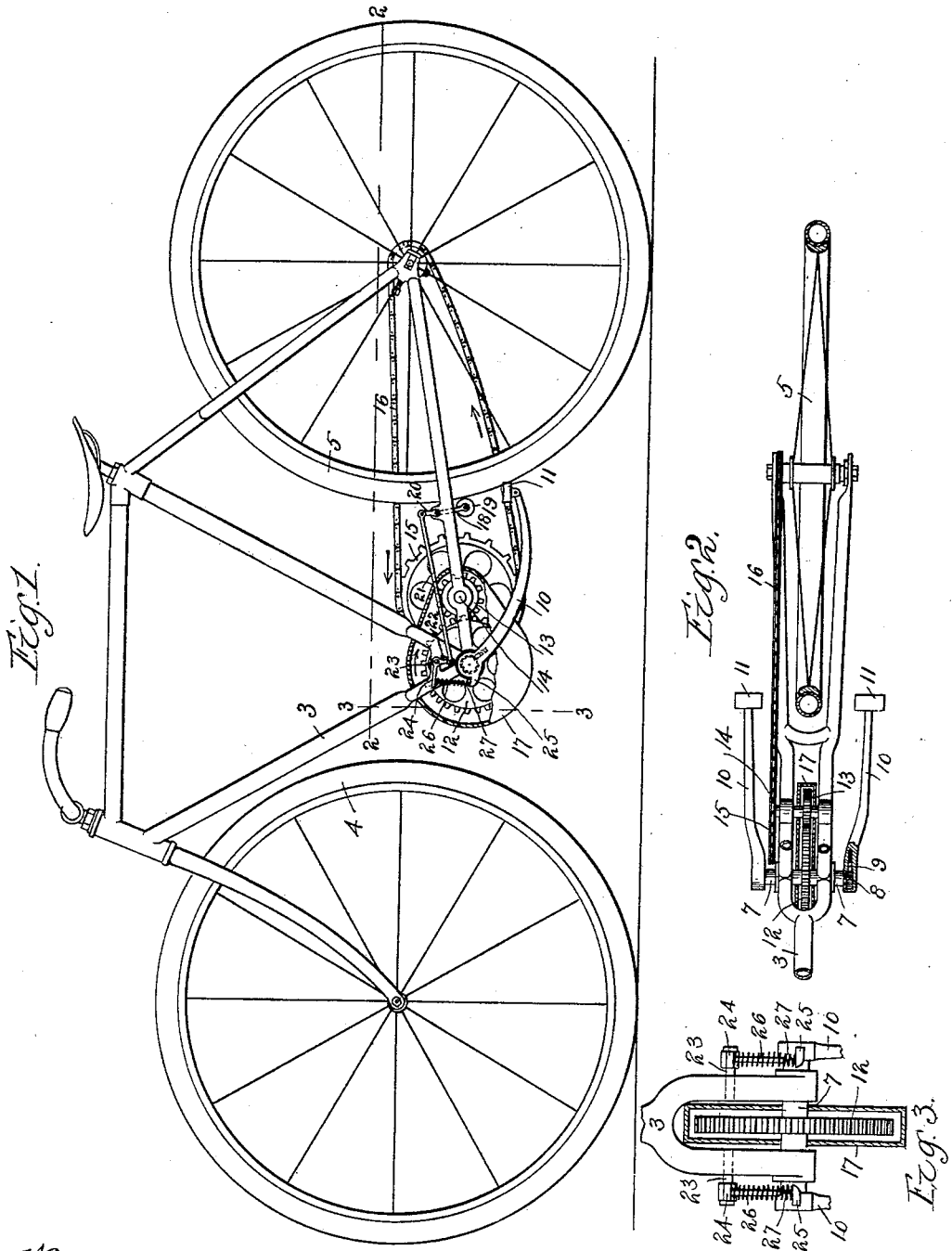

UNITED STATES PATENT OFFICE.

ELZER C. NOE, OF CHICAGO, ILLINOIS.

BICYCLE.

SPECIFICATION forming part of Letters Patent No. 623,173, dated April 18, 1899.

Application filed August 29, 1898. Serial No. 689,765. (No model.)

*To all whom it may concern:*

Be it known that I, ELZER C. NOE, a citizen of the United States, residing at Chicago, in the county of Cook and State of Illinois, have invented certain new and useful Improvements in Bicycles, of which the following is a specification, reference being had to the accompanying drawings.

My invention relates to bicycles, and has for its object to provide a construction by which higher gearing may be employed and the propelling power may be applied to better advantage by the rider; to provide for mounting the pedals centrally, thereby avoiding the twisting strain incident to the mounting of pedals in the way commonly employed at present; to provide for narrowing the tread, and to provide improved brake mechanism by which the brake may readily be applied to the rear wheel. I accomplish all these objects as illustrated in the drawings and as hereinafter described.

What I regard as new will be set forth in the claims.

In the accompanying drawings, Figure 1 is a side elevation, part of the casing being broken away. Fig. 2 is a horizontal section on line 2 2 of Fig. 1, and Fig. 3 is a vertical section on line 3 3 of Fig. 1.

Referring to the drawings, 3 indicates the frame of a bicycle, which is preferably of the usual "diamond" pattern, and 4 5 the wheels. The rear wheel 5 carries a sprocket-wheel 6, such as is commonly employed in safety-bicycles.

7 indicates the main shaft of the bicycle, which is mounted in suitable bearings in the lower portion of the frame, preferably at the point where the crank-shaft of safety-bicycles has usually been placed. The shaft 7 is provided at each end with a ratchet-wheel 8, which ratchet-wheels are adapted to be engaged by pawls 9, carried by foot-levers 10, mounted upon the opposite ends of shaft 7, as shown in Fig. 2. The arrangement is such that the shaft 7 is caused to rotate by downward pressure upon the levers 10. The levers 10 are curved upward, as shown in Fig. 1, in order to give room to the foot when the lever is in its lower position and to prevent the foot from striking any obstruction, the bowed part of the lever serving as a protection for the rider's foot. The levers 10 carry pedals 11, as shown in the drawings, which pedals are secured centrally upon the said levers, so that there is no twisting strain, as is the case in the ordinary safety-bicycle pedal. The shaft 7 is provided with a gear-wheel 12, which, as best shown in Fig. 2, is mounted centrally upon said shaft. The gear-wheel 12 rotates with the shaft 7 and meshes with a pinion 13, mounted upon a suitable shaft 14, carried by the frame of the bicycle, as shown in the drawings. The shaft 14 projects a short distance beyond one side of the frame, as shown in Fig. 2, and carries a sprocket-wheel 15, which is placed in line with the sprocket-wheel 6 and is connected therewith by a chain 16, as shown in the drawings. By this construction when the wheel 12 is rotated, as indicated by the arrow in Fig. 1, the chain 16 is caused to move in the direction indicated by the arrows in Fig. 1, thereby propelling the bicycle in a forward direction. In order to protect the wheels 12 and 13 and properly lubricate them, they are provided with a casing 17, which incloses them and is filled with a suitable lubricator. By this means they are not only properly lubricated at all times, but they are effectually protected from dust, dirt, &c.

18 indicates a brake-lever which is pivoted upon the frame of the machine in proximity to the rear wheel and carries a brake 19, as shown in Fig. 1. The brake-lever 18 is provided with cranks 20, which are connected by connecting-rods 21, each with one arm 22 of bell-crank levers which are mounted at opposite sides of the machine upon studs 23, as shown in Fig. 3. Each of the bell-crank levers is provided with a horizontal arm 24, as shown in Fig. 1, which extends over a lug 25, projecting from the forward end of each foot-lever 10, and each of said arms 24 carries a depending rod 26, which is adapted to be engaged by the opposite lug 25 when the corresponding foot-lever is depressed to a sufficient extent. Under normal conditions when the bicycle is being propelled the foot-levers 10 are not depressed sufficiently to engage the rods 26. When, however, it is desired to check the speed of the bicycle, an excessive downward movement of either of the levers 10 causes its lug 25 to strike the lower end of the opposite rod or pin 26 and rock the bell-crank lever to which it is attached, setting the brake. In order to return the foot-levers 10 to their operative positions, springs 27 are provided on the pins 26, which springs extend downward beyond the lower end of said pins and bear against the upper surfaces of the lugs 25. When the foot-levers 10 are depressed in propelling the bicycle, the springs 27 are compressed, but not to a sufficient extent to set the brake. Such compression, however, is sufficient to cause said springs to act to return the levers to their normal operative positions.

An important advantage of using a swinging lever operating through ratchet devices and sprocket-wheels to propel the bicycle is that by such construction the rider is enabled to use a higher gearing than in constructions employing the ordinary rotary crank, as by lengthening the foot-levers the necessary power to drive a higher gearing can be secured. A further advantage is that the pedals may be placed closer together than in ordinary safety-bicycle constructions heretofore employed, thereby enabling the rider to apply the power to the best advantage. Furthermore, by the use of a ratchet driving mechanism or equivalent friction devices the bicycle is better adapted for coasting purposes, as the rider may retain his feet on the pedals, and consequently preserve a more comfortable position while coasting, and at the same time control of the bicycle is retained by means of the brake mechanism actuated by the foot-levers. A further advantage is that the operation of the two pedals is independent, so that the rider may operate the pedals singly or together or at irregular intervals and may vary the length of stroke of the two pedals. The ratio in diameters between the different wheels may be varied as desired.

Instead of using sprocket wheels and chains for driving the bicycle equivalent rope drive mechanism may be used—that is to say, pulleys may be substituted for the sprocket-wheels and a rope or cable for the chain.

My improvements may be applied to various forms of velocipedes other than bicycles and to other kinds of safety-bicycles than that illustrated, such as tandems, triplets, &c.

That which I claim as my invention, and desire to secure by Letters Patent, is—

1. In a bicycle, the combination with the frame and wheels, of a brake adapted to be applied to one of said wheels, swinging foot-levers for propelling the bicycle, a bell-crank lever, a rod connecting said bell-crank lever with the brake, means for operating the brake therefrom, and means for rocking said bell-crank lever by excessive downward pressure applied to one of said foot-levers, substantially as and for the purpose specified.

2. In a bicycle, the combination with a pair of swinging levers on the drive-shaft having lugs or projections thereon, of a brake adapted to be applied to one of the bicycle-wheels, bell-crank levers mounted on the frame and connected to said brake, rods depending from said bell-crank levers and adapted to be engaged by the lugs on said swinging levers and springs encircling said rods, extending below the lower end thereof and engaged by said lugs, as and for the purpose described.

3. In a bicycle, the combination with the frame and wheels, of a brake adapted to be applied to one of said wheels, swinging foot-levers for propelling the bicycle, bell-crank levers, means for operating the brake therefrom, means for rocking said bell-crank levers by excessive downward movement of said foot-levers, and springs carried by said bell-crank levers and adapted to be compressed by the operation of said foot-levers, substantially as described.

4. In a bicycle, the combination with the frame and wheels, of a brake adapted to be applied to one of said wheels, swinging foot-levers for propelling the bicycle, bell-crank levers, means for operating the brake therefrom, said bell-crank levers having pins 26 and springs 27 extending beyond said pins, and lugs 25 carried by said foot-levers and adapted to engage said springs, substantially as described.

5. In a bicycle, the combination with a pivoted foot-lever having a lug 25 forward of the pivot, of a spring adapted to contact with said lug to return the lever to position to receive a downward stroke, substantially as specified.

ELZER C. NOE.

Witnesses:
JOHN L. JACKSON,
A. H. ADAMS.